(12) United States Patent
Kim et al.

(10) Patent No.: US 12,286,036 B2
(45) Date of Patent: Apr. 29, 2025

(54) SEAT SLIDING APPARATUS FOR VEHICLES

(71) Applicants: HYUNDAI TRANSYS INC., Seosan-si (KR); DAEDONG MOVEL SYSTEM CO., LTD., Siheung-si (KR)

(72) Inventors: Gyeong Min Kim, Hwaseong-si (KR); Young Sic Joo, Siheung-si (KR); Chan Ju Kim, Gunpo-si (KR); In Gul Baek, Hwaseong-si (KR); Ki Young Yun, Incheon (KR)

(73) Assignees: HYUNDAI TRANSYS INC., Seosan-si (KR); DAEDONG MOVEL SYSTEM CO., LTD., Siheung-si (KR)

( * ) Notice: Subject to any disclaimer, the term of this patent is extended or adjusted under 35 U.S.C. 154(b) by 137 days.

(21) Appl. No.: 18/139,001

(22) Filed: Apr. 25, 2023

(65) Prior Publication Data
US 2023/0356631 A1 Nov. 9, 2023

(30) Foreign Application Priority Data
May 9, 2022 (KR) .................. 10-2022-0056582

(51) Int. Cl.
*B60N 2/06* (2006.01)
*B60N 2/02* (2006.01)

(52) U.S. Cl.
CPC .......... *B60N 2/067* (2013.01); *B60N 2/02246* (2023.08); *B60N 2/02253* (2023.08)

(58) Field of Classification Search
CPC . B60N 2/067; B60N 2/02246; B60N 2/02253
See application file for complete search history.

(56) References Cited

U.S. PATENT DOCUMENTS

| 4,872,903 A | 10/1989 | Periou |
| 9,139,110 B2 | 9/2015 | Bosecker et al. |
(Continued)

FOREIGN PATENT DOCUMENTS

| JP | 6338048 | 2/1988 |
| JP | 01127596 A | 5/1989 |
(Continued)

OTHER PUBLICATIONS

European Search Report from European Patent Office in EP23171309.0 dated Sep. 22, 2023.
(Continued)

*Primary Examiner* — Mark R Wendell
(74) *Attorney, Agent, or Firm* — Quantum Patent Law Firm; Seongyoune Kang

(57) ABSTRACT

A seat sliding apparatus for a vehicle is provided. The seat sliding apparatus may include a lead screw configured to define a first toothed part on an outer circumferential surface thereof, and disposed in forward and rearward directions of a vehicle, a worm gear rotated by a driving motor, a transmission gear assembly engaged with the worm gear to be rotated, a power transmission belt engaged with the transmission gear assembly, and a nut unit including a first nut configured such that a second toothed part engaged with the first toothed part is defined on an inner circumferential surface thereof, and a second nut configured to come into contact with the power transmission belt.

11 Claims, 6 Drawing Sheets

(56) References Cited

U.S. PATENT DOCUMENTS

2018/0099583 A1* 4/2018 Yagi .................... B60N 2/1635
2023/0014786 A1* 1/2023 Kim .................. B60N 2/02246

FOREIGN PATENT DOCUMENTS

| KR | 10-1991-0000934 B1 | 4/1988 |
| KR | 101344390 B1 | 12/2013 |
| KR | 10-2284924 B1 | 7/2021 |
| KR | 10-2352950 B1 | 1/2022 |

OTHER PUBLICATIONS

Office Action from corresponding KR Application No. 10--2022-0056582 dated Apr. 30, 2024.
Written Decision on Registration in Korean App. No. 10-2022-0056582 dated Jan. 8, 2025.

* cited by examiner

CROSS-SECTION A'-A

SEAT SLIDING APPARATUS FOR VEHICLES

CROSS-REFERENCE TO RELATED APPLICATION

This application under 35 U.S.C. § 119(a) claims priority to Korean Patent Application No. 10-2022-0056582 filed on May 9, 2022, the entire contents of which are incorporated herein by reference.

BACKGROUND

(a) Technical Field

The present disclosure relates to a seat sliding apparatus for vehicles which has a dual nut structure so as to prevent a seat from being separated from a rail.

(b) Background Art

In general, seats including a driver's seat on which passengers sit are provided in a vehicle, and the seats are configured to be slid in the forward and rearward directions depending on passenger's body conditions or driving habits. In order to slide the seat, a driving motor, and a gear box moved in the forward and rearward directions along a lead screw by driving force generated by the driving motor are required.

Particularly, a long rail structure is applied to an autonomous vehicle so that a seat is slid a long distance on the flat bottom surface of the vehicle so as to implement various seat layouts. However, when a seat sliding apparatus configured to slide the seat is installed in the long rail structure such that the entirety of the seat sliding apparatus is exposed to the interior space of the vehicle, foreign substances, such as dust, settle on a lead screw and obstruct sliding of the seat, and thereby, it is difficult to secure operational reliability of the seat for a long time. Moreover, a user is not capable of sufficiently utilizing a space under the seat, and the minimum height of the seat is restricted by the installation height of the lead screw.

Further, a nut configured to move the gear box along the lead screw is damaged during collision of the vehicle, and thus, the seat may be unintentionally be slid along the lead screw. That is, the seat may be undesirably accelerated due to impact, and the risk of injury to a passenger sitting on the seat may be increased. In order to solve these problems, use of a nut formed of metal has been suggested to secure rigidity of the nut, but in this case, a loud noise caused by friction between the nut and the lead screw occurs.

The above information disclosed in this Background section is only for enhancement of understanding of the background of the present disclosure and therefore it may contain information that does not form the prior art that is already known in this country to a person of ordinary skill in the art.

SUMMARY OF THE DISCLOSURE

The present device has been made in an effort to solve the above-described problems associated with the prior art, and it is an object of the present disclosure to provide a seat sliding apparatus for vehicles to which both a nut formed of plastic to drive a seat and a nut formed of steel to prevent the seat from being separated from a rail during collision of a vehicle are applied simultaneously.

It is another object of the present disclosure to provide a seat sliding apparatus for vehicles which may slide a seat in the forward and rearward directions and have a reduced installation height so as to achieve wide use of the interior space of a vehicle.

In one aspect, the present disclosure provides a seat sliding apparatus for vehicles, including a lead screw including a first toothed part on an outer circumferential surface thereof, and disposed in forward and rearward directions of a vehicle, a worm gear configured to be rotated by a driving motor, a transmission gear assembly engaged with the worm gear to be rotated, a power transmission belt configured to be engaged with the transmission gear assembly, and a nut unit including a first nut including a second toothed part defined on an inner circumferential surface thereof, the second toothed part configured to be engaged with the first toothed part, the nut unit further including a second nut configured to come into contact with the power transmission belt, wherein the second nut is configured to be rotated by the power transmission belt, and the first nut connected to the second nut is configured to be moved along the lead screw by rotational force of the second nut.

In one embodiment, a third toothed part may be defined on an inner circumferential surface of the second nut, and a predetermined gap is formed between the third toothed part and the first toothed part in a normal state of the seat sliding apparatus when impact is not applied to the seat sliding apparatus.

In another embodiment, a height of each of teeth of the third toothed part may be greater than a height of each of teeth of the second toothed part.

In still another embodiment, the first nut may be deformed and the third toothed part of the second nut may be engaged with the first toothed part such that the predetermined gap is altered, when impact is applied to the seat sliding apparatus, and the second nut may be formed of a material having a greater rigidity than the first nut.

In yet another embodiment, an inner circumferential surface of the second nut may be divided into a first area in which a third toothed part is disposed, and a second area in which a plurality of protrusions are disposed, and the plurality of the protrusions in the second area may be engaged with a plurality of depressions formed on an outer circumferential surface of the first nut.

In still yet another embodiment, a part of the first nut in which the depressions are formed on the outer circumferential surface thereof may be inserted into the second area of the second nut.

In a further embodiment, the transmission gear assembly may include a helical gear engaged with the worm gear, and a spur gear engaged with the power transmission belt, and a belt toothed part engaged with a spur gear toothed part provided on an outer circumferential surface of the spur gear may be provided on an inner peripheral surface of the power transmission belt.

In another further embodiment, a fourth toothed part engaged with a belt toothed part provided on an inner circumferential surface of the power transmission belt is provided on a part of an outer circumferential surface of the second nut.

In still another further embodiment, a number of teeth of the spur gear engaged with the belt toothed part and a number of teeth of the fourth tooth part of the second nut engaged with the belt toothed part may be different.

In yet another further embodiment, the seat sliding apparatus may further include a gear box configured to surround the worm gear, the transmission gear assembly, the power transmission belt and the nut unit, a first part of the gear box may be disposed within an interior space of a vehicle and a second part of the gear box may be disposed outside an interior space be exposed such that the nut unit may be disposed inside the interior space, and the worm gear and the transmission gear assembly may be disposed outside the interior space.

Other aspects and example embodiments of the device are discussed infra.

The above and other features of the device are discussed infra.

BRIEF DESCRIPTION OF THE DRAWINGS

The above and other features of the present device will now be described in detail with reference to certain example embodiments thereof illustrated in the accompanying drawings which are given hereinbelow by way of illustration only, and thus are not limitative of the present disclosure, and wherein.

Figure 1:
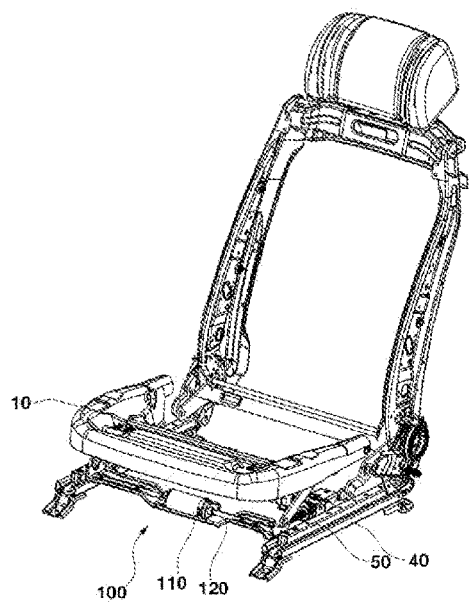
FIG. 1 is a perspective view illustrating a seat having a seat sliding apparatus for vehicles according to one embodiment of the present disclosure.

It should be understood that the appended drawings are not necessarily to scale, presenting a somewhat simplified representation of various example features illustrative of the basic principles of the present device. The specific design features of the present device as disclosed herein, including, for example, specific dimensions, orientations, locations, and shapes, will be determined in part by the particular intended application and use environment.

In the figures, reference numbers refer to the same or equivalent parts of the present device throughout the several figures of the drawing.

DETAILED DESCRIPTION

Advantages and features of the present device and methods for achieving the same will become apparent from the descriptions of aspects herein below with reference to the accompanying drawings. However, the present disclosure is not limited to the aspects disclosed herein but may be implemented in various different forms. The aspects are provided to make the description of the present device thorough and to fully convey the scope of the present disclosure to those skilled in the art. It is to be noted that the scope of the present disclosure is defined only by the claims. The same reference numerals designate the same elements throughout the disclosure.

In the following description of the embodiments, terms, such as "first" and "second", may be used only to distinguish one element from other elements, but do not limit the elements or imply a sequence or order unless clearly indicated by the context.

The following detailed description will exemplarily illustrate the present disclosure. Further, the description will explain the example embodiments of the present disclosure, and it should be apparent to those skilled in the art that various substitutions, changes and modifications which will not be exemplified hereinafter may be made. That is, it is to be understood that various modifications and changes of the embodiments will become apparent to those skilled in the art within the spirit and scope of the present disclosure, the spirit and scope of equivalents of the disclosure and/or the scope and range of technology or knowledge of the art. The following embodiments will be illustrated in the best mode to implement the technical idea of the present disclosure, and various modifications and changes thereof required in the field of application of the present disclosure may be made. Therefore, it is to be understood that the present disclosure is not intended to be limited to the following detailed description. Further, it is to be interpreted that all variations within the scope of the claims and their equivalents are to be construed as being included in the present disclosure.

Figure 2:
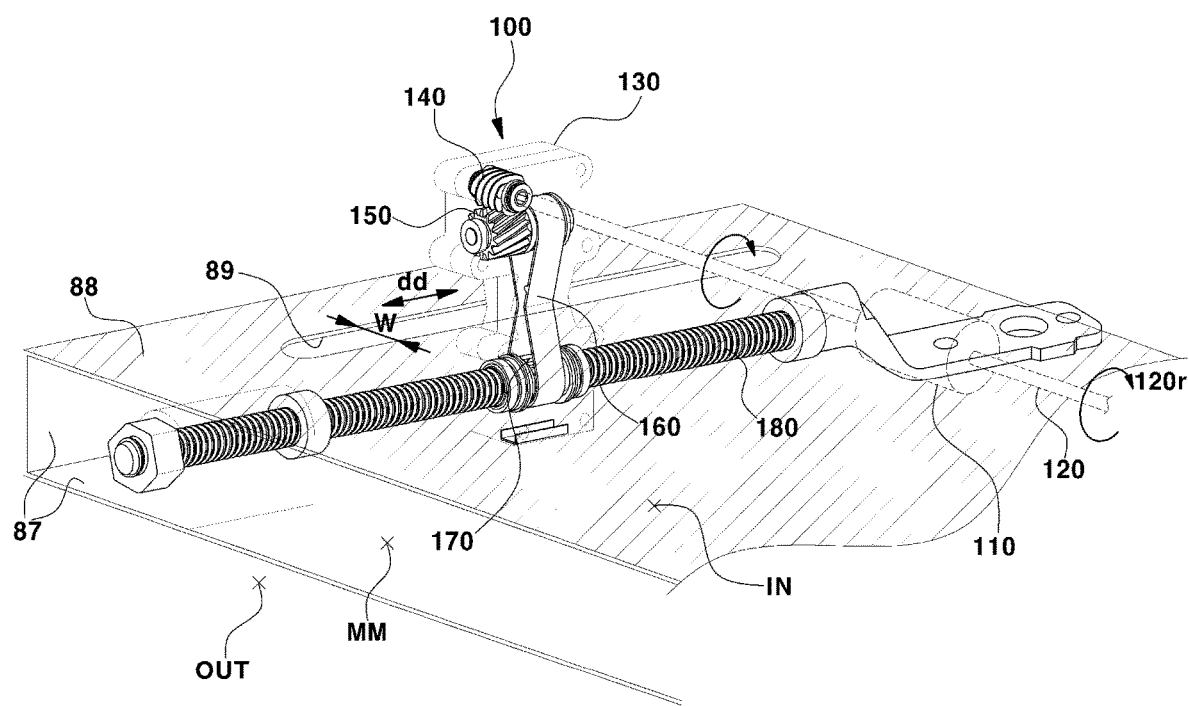
FIG. 2 is a perspective view illustrating one side portion of the configuration of the seat sliding apparatus according to one embodiment of the present disclosure.

FIG. 1 is a perspective view illustrating a seat having a seat sliding apparatus for vehicles according to one embodiment of the present disclosure, and FIG. 2 is a perspective view illustrating one side portion of the configuration of the seat sliding apparatus according to one embodiment of the present disclosure.

Referring to FIGS. 1 and 2, a seat sliding apparatus 100 for vehicles may be an apparatus which slides a seat 10 of a vehicle in the forward and rearward directions using rotational force of a driving motor 110. The seat sliding apparatus 100 may include a lead screw 180 disposed in a direction of forward and rearward movement of the seat 10, a rotary shaft 120 driven by the driving motor 110 to be rotated, and a gear box 130 connected to the rotary shaft 120 to receive rotational driving force from the rotary shaft 120 and configured to be moved along the lead screw 180.

The gear box 130 may include a worm gear 140 engaged with one end of the rotary shaft 120 to be rotated, a transmission gear assembly 150 engaged with the worm gear 140 to be rotated, a power transmission belt 160 engaged with the transmission gear assembly 150, and a nut unit 170 configured to come into contact with the power transmission belt 160 and to be rotated in a direction of rotation of the power transmission belt 160. The worm gear 140 and the transmission gear assembly 150 may be disposed such that the rotary axis of the transmission gear assembly 150 is perpendicular to the rotary axis of the worm gear 140. The transmission gear assembly 150, the power transmission belt 160 and the nut unit 170 may be rotated in the same direction. That is, the respective rotary axes of the transmission gear assembly 150, the power transmission belt 160 and the nut unit 170 may be parallel to one another. The lead screw 180 may be installed in a stationary frame 40 fixed to a vehicle body. A seat frame 50 fixed to the seat 10 may be fixed to the gear box 130. When the driving motor 110 is rotated in a regular direction or the reverse direction, the rotational driving force may be sequentially transmitted to the rotary shaft 120, the worm gear 140, the power transmission belt 160 and the nut unit 170, and the nut unit 170 together with the gear box 130 and the seat frame 50 may be moved forwards or rearwards on the lead screw 180, thereby being capable of sliding the seat 10.

The driving motor 110 may be driven by power supplied from the outside, and the rotary shaft 120 may be coupled to each of both sides of a rotor of the driving motor 110 so as to be rotated in the regular direction and the reverse direction 120r. The driving motor 110 may be moved in the forward and rearward directions dd together with movement of the gear box 130 in the forward and rearward directions dd.

A part of the gear box 130 may be disposed under a bottom surface 88 of an interior space IN of the vehicle. The part of the gear box 130 may pass through a slit having a small width w formed through the bottom surface 88. Among the elements disposed in the gear box 130, the nut unit 170 may be disposed below the bottom surface 88. The lead screw 180 may be disposed below the bottom surface 88. The lead screw 180 may be installed on a support surface 87 of an installation space MM disposed between the interior space IN of the vehicle and an outdoor space OUT.

The worm gear 140 may be rotated by receiving torque transmitted from the rotary shaft 120 rotated in the regular or reverse direction 120r by the driving motor 110. The worm gear 140 may be disposed in the upper part of an accommodation space defined by the gear box 130. The worm gear 140 may be disposed above the bottom surface 88 of the interior space IN of the vehicle.

The transmission gear assembly 150 may transmit rotational force received from the worm gear 140 to the power transmission belt 160. The transmission gear assembly 150 may be disposed in the upper part of the accommodation space defined by the gear box 130. The transmission gear assembly 150 may be disposed above the bottom surface 88 of the interior space IN of the vehicle.

The power transmission belt 160 may be engaged with the transmission gear assembly 150 so as to transmit the rotational force received from the transmission gear assembly 150 to the nut unit 170. The power transmission belt 160 may be disposed to perform power transmission between the transmission gear assembly 150 disposed in a direction perpendicular to the bottom surface 88 of the interior space IN of the vehicle and the nut unit 170. The power transmission belt 160 may come into contact with the transmission gear assembly 150 and the nut unit 170, and may thus serve to transmit the power in a vertical direction.

The nut unit 170 may be moved along the lead screw 180 by the rotational force received from the power transmission belt 160. The gear box 130 may be moved along the lead screw 80 depending on movement of the nut unit 170. Movement of the nut unit 170 may be implemented by engagement between a toothed part formed on the outer circumferential surface of the lead screw 180 and a toothed part formed on the inner circumferential surface of the nut unit 170. The nut unit 170 may be disposed in the lower part of the accommodation space defined by the gear box 130. The nut unit 170 may be disposed below the bottom surface 88 of the interior space IN of the vehicle.

In the above-described example, the upper and lower parts of the accommodation space defined by the gear box 130 may be defined based on the bottom surface 88 of the interior space IN of the vehicle.

According to one embodiment of the present disclosure, the gear box 130 may extend in the direction perpendicular to the bottom surface 88 of the interior space IN of the vehicle, i.e., may extend in the direction perpendicular to the bottom surface 88 by the power transmission belt 160 which performs power transmission between the transmission gear assembly 150 and the nut unit 170. Concretely, a part of the gear box 130 may be disposed under the bottom surface 88 of the interior space IN of the vehicle, and the other part of the gear box 130 may be disposed on the bottom surface 88 of the interior space IN of the vehicle, by the power transmission belt 160. Therefore, the lead screw 180 may be disposed below the bottom surface 88 of the interior space IN of the vehicle and only a part of the gear box 130 moved along the lead screw 180 may be exposed from the bottom surface 88, and thereby, wide use of the interior space IN of the vehicle may be achieved by reducing the installation height of the seat sliding apparatus 100.

Figure 3:
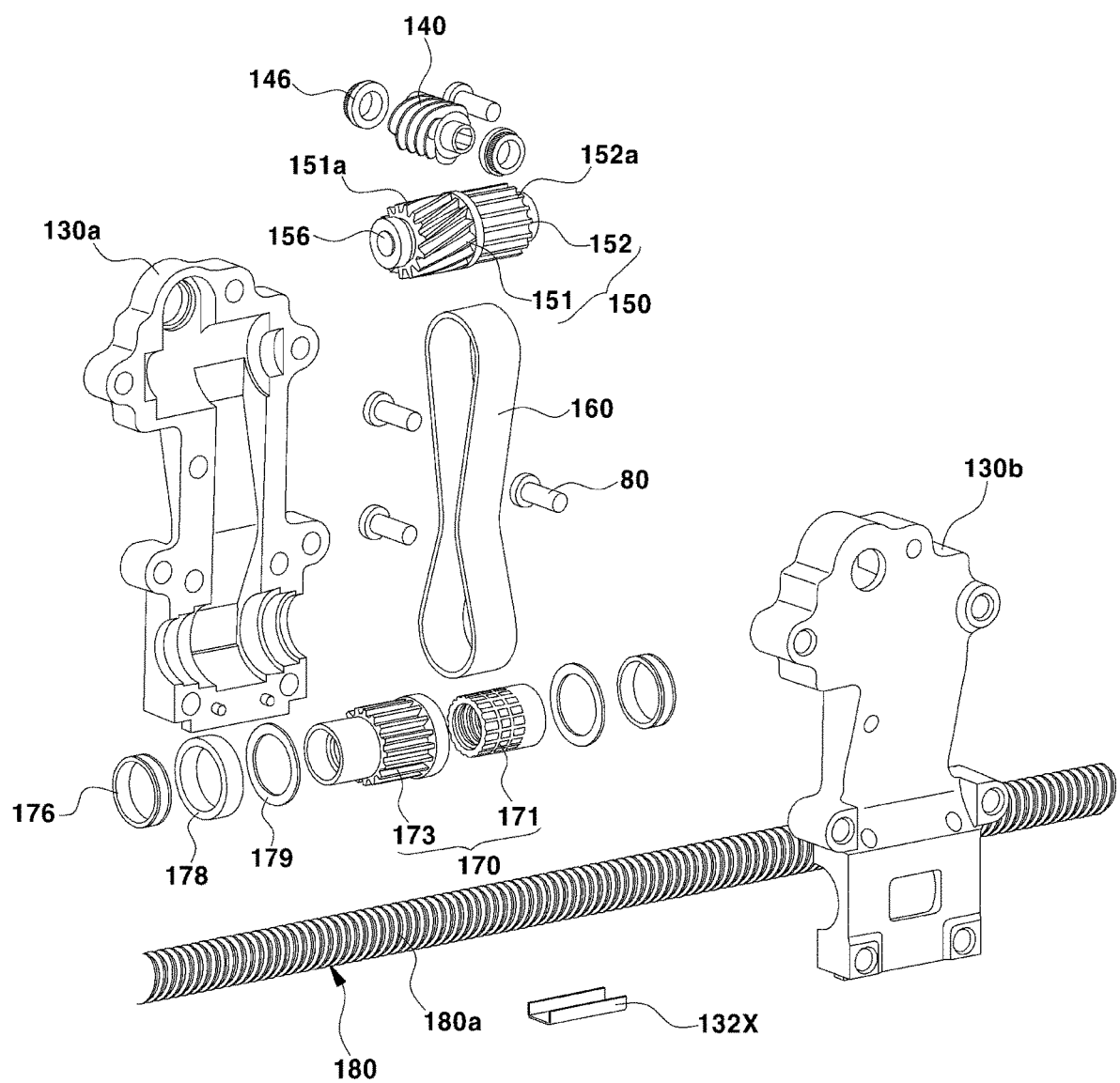
FIG. 3 is an exploded perspective view illustrating respective elements of a gear box according to one embodiment of the present disclosure.
Figure 4:
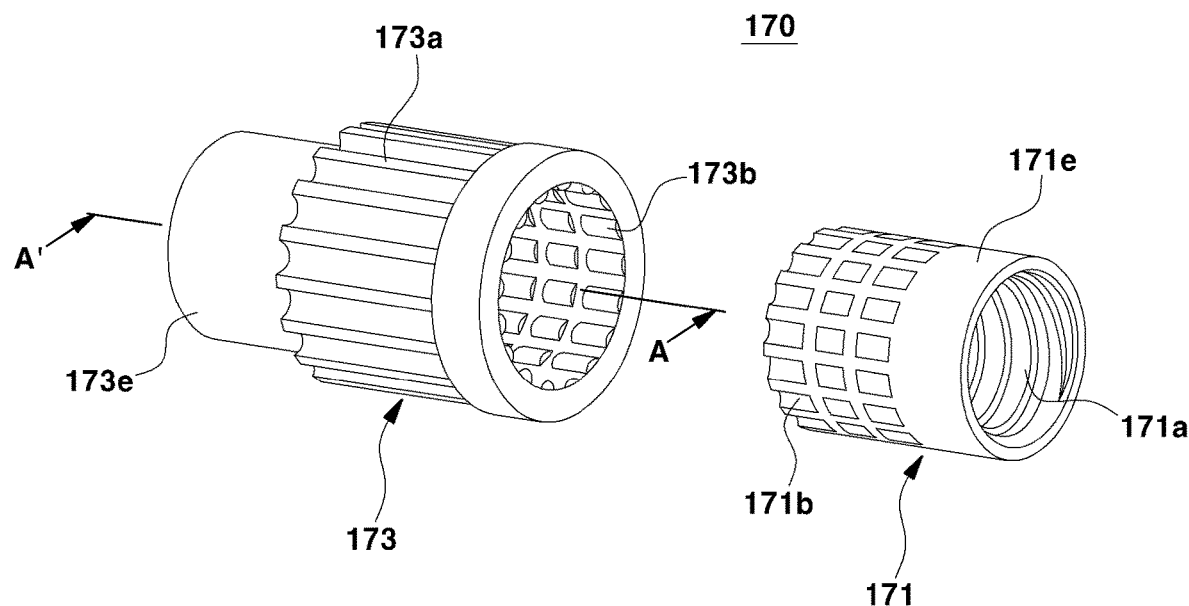
FIG. 4 is a perspective view illustrating assembly of a nut unit according to one embodiment of the present disclosure.

FIG. 3 is an exploded perspective view illustrating the respective elements of the gear box according to one embodiment of the present disclosure, and FIG. 4 is a perspective view illustrating assembly of the nut unit according to one embodiment of the present disclosure. For the purpose of brief explanation, a description of redundant content will be omitted.

Referring to FIGS. 3 and 4, the gear box 130 may be formed by coupling two segmental casings 130a and 130b by fixing bolts so as to prepare the accommodation space therein. A coupling slide 132x having a U-shaped cross-section which binds and fixes the lower parts of the two segmental casings 130a and 130b so as to prevent the segmental casings 130a and 130b in the coupled state from being separated may be provided. The worm gear 140 may be disposed in the uppermost part of the accommodation space defined by the gear box 130, and the transmission gear assembly 150 and the nut unit 170 may be sequentially disposed therebelow.

Bushings 146 may be provided at both sides of the worm gear 140. The worm gear 140 and the bushings 146 may be connected to the rotary shaft 120 connected to the driving motor 110.

The transmission gear assembly 150 may include a helical gear 151 engaged with the worm gear 140, and a spur gear 152 engaged with the power transmission belt 160. The helical gear 151 and the spur gear 152 may be formed integrally. For example, the helical gear 151 and the spur gear 152 may be formed as one body by injection molding, and in this case, a worm wheel having the helical gear 151 may be formed and thereafter a transmission gear having the spur gear 152 may be formed by injection molding. Therefore, a separate element configured to transmit rotational driving force from the helical gear 151 rotated by the worm gear 140 to the spur gear 152 is not required, and thus, the gear box 130 may be formed in a more compact configuration. A worm gear toothed part 140a formed in a helical shape may be provided on the outer circumferential surface of the worm gear 140. A helical gear toothed part 151a may be provided on the outer circumferential surface of the helical gear 151, and a spur gear toothed part 152a may be provided on the outer circumferential surface of the spur gear 152. The helical gear toothed part 151a may be engaged with the worm gear toothed part 140a, and the spur gear toothed part 152a may be engaged with a belt toothed part (not shown) provided on the inner peripheral surface of the power transmission belt 160. Rotary protrusions (not shown) may be formed at the centers of rotation of both ends of the transmission gear assembly 150 in a direction of the rotary axis thereof, and the rotary protrusions (not shown) may be rotatably installed in the upper part of the gear box 130 by ring-shaped bushings 156.

The power transmission belt 160 may be provided in a closed curve form, and may perform power transmission between the spur gear 152 of the transmission gear assembly 150 and a second nut 173 of the nut unit 170. The power transmission belt 160 may be formed of a flexible material, such as rubber, a resin, etc., may be installed in the state in which the power transmission belt 160 surrounds the spur gear 152 and the second nut unit 173, and may transmit the rotational driving force from the transmission gear assembly 150 to the second nut unit 173. The power transmission belt 160 may be installed in the state in which it surrounds the area of 180 degrees of more of the outer circumferential surface of each of the transmission gear of the transmission gear assembly 150 and the nut unit 170. Thereby, the power transmission belt 160 may minimize loss of the rotational driving force transmitted from the transmission gear assembly 150 to the nut unit 170. The belt toothed part (not shown) defined on the inner peripheral surface of the power transmission belt 160 will be described below.

The nut unit 170 may include a first nut 171 engaged with the lead screw 180, and the second nut 173 engaged with the power transmission belt 160. For example, the first nut 171 may be formed of plastic, and the second nut 173 may be formed of metal. For example, the first nut 171 may be disposed in a direction of rearward sliding of the seat, compared to the second nut 173. A first toothed part 180a may be defined on the outer circumferential surface of the lead screw 180. Referring to FIG. 4, a second toothed part 171a engaged with the first toothed part 180a may be defined on the inner circumferential surface of the first nut 171, a third toothed part (not shown) may be defined on the inner circumferential surface of the second nut 173, and a fourth toothed part 173a engaged with the power transmission belt 160 may be defied on a part of the outer circumferential surface of the second nut 173. For example, the second toothed part 171a of the first nut 171 and the third toothed part (not shown) of the second nut 173 may be formed in a helical gear shape. The second toothed part 171a and the third toothed part (not shown) may have different tooth shapes, and the second toothed part 171a and the third toothed part (not shown) may have different pitch values. For example, each of the first toothed part 180a, the second toothed part 171a and the third toothed part (not shown) may include a plurality of teeth. A plurality of grooves may be defined by the plurality of teeth. Concretely, the height of each of the teeth of the second toothed part 171a may be less than the height of each of the teeth of the third toothed part (not shown), and the height of each of the teeth of the second toothed part 171a may be substantially the same as the height of each of the first toothed part 180a. That is to say, the depth of the grooves defined on the second toothed part 171a may be less than the depth of the grooves defined on the third toothed part (not shown), and the depth of the grooves defined on the second toothed part 171a may be substantially the same as the depth of the grooves defined on the first toothed part 180a. However, the pitch circle diameters of the second toothed part 171a and the third toothed part (not shown) may be the same. Therefore, in a normal state in which impact is not applied to the vehicle, the first toothed part 180a and the second toothed part 171a may be engaged with each other, but the first toothed part 180a and the third toothed part (not shown) may not be engaged with each other.

A plurality of protrusions 173b may be disposed on the inner circumferential surface of the second nut 173, and a plurality of depressions 171b may be disposed on the outer circumferential surface of the first nut 171. The protrusions 173b may be engaged with the depressions 171b, and the first nut 171 and the second nut 173 may be coupled to each other by inserting the protrusions 173b into the depressions 171b. A part of the first nut 171 in which the depressions 171b are defined may be inserted into the second nut 173. No separate teeth may be formed on the outer circumferential surface of the other part of the first nut 171 in which the depressions 171b are not defined, and this part of the first nut 171 may not be inserted into the second nut 173 and may be exposed to the outside. The second toothed part 171a formed on the inner circumferential surface of the first nut 171 may remain engaged with the first toothed part 180a of the lead screw 180, when the seat is being slid or the seat is stopped. That is to say, separation of the first nut 171 from the second nut 173 may be prevented through coupling between the protrusions 173b and the depressions 171b.

A part of the second nut 173 in which the fourth toothed part 173a is not provided on the outer circumferential surface thereof may be defined as an extension part 173e. The extension part 173e may have a smaller diameter than the other part of the second nut 173 having the fourth toothed part 183a provided on the outer circumferential surface thereof. For example, the diameter of the first nut 171 may be the same as the diameter of the extension part 173e of the second nut 173. A bushing 176, a steel washer 178 and a vibration absorption washer 179 may be disposed around the extension part 173e having a hollow cylindrical shape. That is, the extension part 173e may be inserted into the bushing 176, the steel washer 178 and the vibration absorption washer 179 which are formed in a ring shape. The bushing 176 may be installed in the gear box 130, and may serve to facilitate rotation of the nut unit 170 and adjust clearance of the nut unit 170. The bushing 176 may include a plastic bushing and a rubber ring disposed on the plastic bushing. The steel washer 178 may serve to increase the strength of the nut unit 170 in a direction of extension of the rotary axis of the nut unit 170. The vibration absorption washer 179 may be formed of rubber. The vibration absorption washer 179 may absorb vibration occurring between the nut unit 170 and the segmental casings 130a and 130b.

A part of the first nut 171 in which the depressions 171b are not defined may be defined as a flat part 171e. The flat part 171e may not be inserted into the second nut 173, and may be exposed. A bushing 176 and a vibration absorption washer 179 may be disposed around the flat part 171e. Concretely, the flat part 171e may be inserted into the bushing 176 and the vibration absorption washer 179 which are formed in a ring shape.

In addition, a damper (not shown) configured to absorb minor impact applied at the moment when movement of the nut unit 170 in the forward or rearward direction is stopped may be additionally disposed around each of the extension part 173e and the flat part 171e. The damper (not shown) may be formed of a compressible material, such as rubber.

For example, the first nut 171 may serve as a driver configured to move the gear box 130. Therefore, the second toothed part 171a on the inner circumferential surface of the first nut 171 may remain engaged with the first toothed part 180a on the outer circumferential surface of the lead screw 180 at all times.

For example, the second nut 173 may serve to prevent the seat from being slid on a rail when impact is applied to the vehicle. The third toothed part (not shown) on the inner circumferential surface of the second nut 173 remains contactless with or disengaged from the first toothed part 180a on the outer circumferential surface of the lead screw 180, but the third toothed part (not shown) is engaged with the first toothed part 180a, when impact is applied to the rail. When the third toothed part (not shown) is engaged with the first toothed part 180*a*, the coupled state of the gear box 130 to the lead screw 180 may be maintained.

Figure 5:
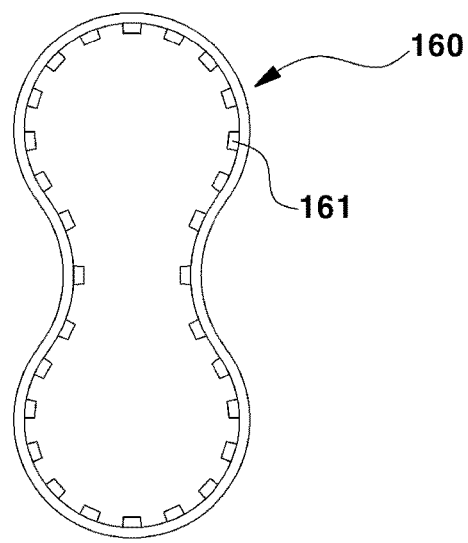
FIG. 5 is a view illustrating a power transmission belt according to one embodiment of the present disclosure.

FIG. 5 is a view illustrating the power transmission belt according to one embodiment of the present disclosure.

Referring to FIGS. 3 to 5, a belt toothed part 161 may be provided on the inner peripheral surface of the power transmission belt 160. The belt toothed part 161 may be engaged with the spur gear toothed part 152*a* provided on the outer circumferential surface of the spur gear 152 and the fourth toothed part 173*a* provided on the outer circumferential surface of the second nut 173. For example, the numbers of teeth of the spur gear 152 of the transmission gear assembly 150 and the second nut 173, which are engaged with the belt toothed part 161, may be different. Therefore, a gear ratio is applied to driving of the power transmission belt 120, and thus, the power transmission belt 120 may be driven at the improved gear ratio.

Figure 6:
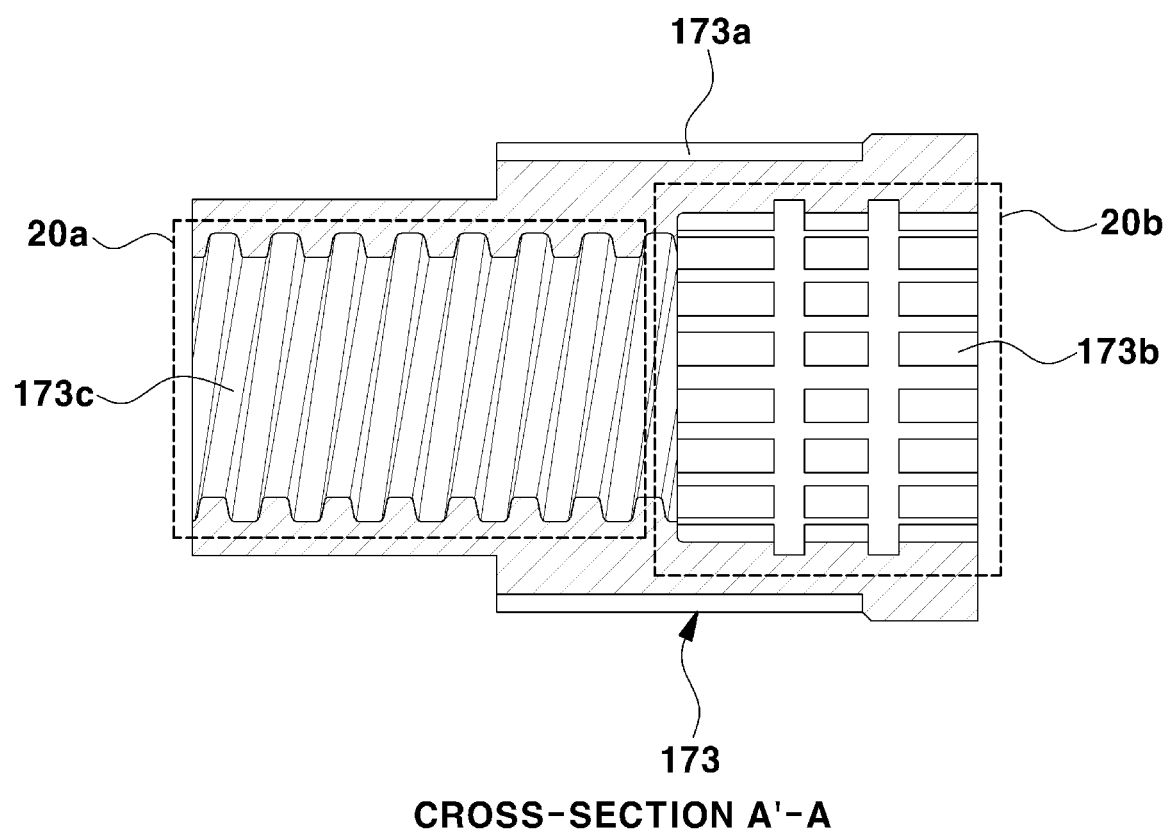
FIG. 6 is a cross-sectional view taken along line A-A' of FIG. 4.

FIG. 6 is a cross-sectional view taken along line A-A' of FIG. 4.

Referring to FIGS. 3, 4 and 6, the inner circumferential surface of the second nut 173 may be divided into a first area 20*a* in which the third toothed part 173 is disposed, and a second area 20*b* in which the plurality of protrusions 173*b* is disposed. For example, a part of the first area 20*a* may be the inner circumferential surface of the extension part 173*e*, and the second area 20*b* may be the inner circumferential surface of a part of the second nut 173 in which the fourth toothed part 173*a* is provided. The protrusions 173*b* in the second area 20*b* may be engaged with the depressions 171*b* defined on the outer circumferential surface of the first nut 171. A part of the first nut 171 in which the depressions 171*b* are defined may be inserted into the second area 20*b* of the second nut 173. Here, the part of the first nut 171 may not be inserted into the inside where the first area 20*a* of the second nut 173 is defined. The plurality of depressions 171*b* and the plurality of protrusions 173*b* may be formed in the same number.

Figure 7:
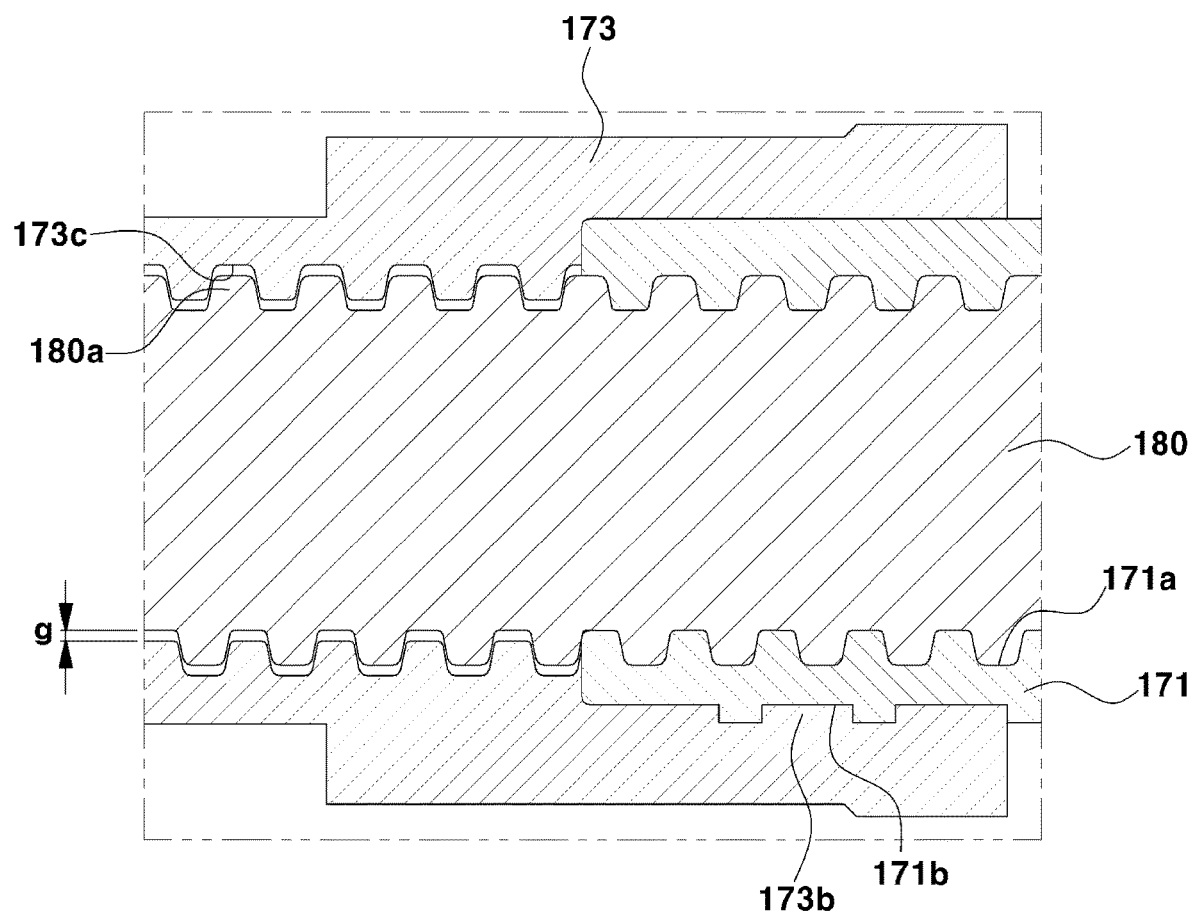
FIG. 7 is a cross-sectional view illustrating a coupling relationship between a lead screw and the nut unit in a normal state according to one embodiment of the present disclosure.

FIG. 7 is a cross-sectional view illustrating a coupling relationship between the lead screw and the nut unit in the normal state according to one embodiment of the present disclosure. For the purpose of brief explanation, a description of redundant content will be omitted.

Referring to FIGS. 3, 6 and 7, under the normal state of the seat sliding apparatus 100, there may be a gap g between the third toothed part 173*c* of the second nut 173 and the first toothed part 180*a* of the lead screw 180. For example, the height of the teeth of the third toothed part 173*c* may be greater than the height of the teeth of the first toothed part 180*a*. Therefore, under the normal state in which no impact is applied to the vehicle, the first toothed part 180*a* and the second toothed part 171 may be engaged with each other, but the first toothed part 180*a* and the third toothed part 173*c* may not be engaged with each other. The gap g may refer to a difference between the height of the first toothed part 180*a* and the height of the third toothed part 173*c*. However, the pitch circle diameter of the second toothed part 171*a* and the pitch circle diameter of the third toothed part 173*c* may be the same. The second toothed part 171*a* provided on the inner circumferential surface of the first nut 171 may remain engaged with the first toothed part 180*a* provided on the outer circumferential surface of the lead screw 180 at all times. The first nut 171 may serve as the driver configured to move the gear box 130. That is, the third toothed part 173*c* may not be engaged with the first toothed part 180*a* and, although the first nut 171 and the second nut 173 are rotated by operating the power transmission belt 160, the nut unit 170 is moved through engagement between the first nut 171 and the lead screw 180, and the second nut 173 may not affect movement of the nut unit 170 in the forward and rearward directions. The second nut 173 is disposed on a power transmission path through which power is transmitted from the power transmission belt 160 to the lead screw 180, but the rotational force received from the power transmission belt 160 by the second nut 173 may be transmitted to the first nut 171 and the first nut 171 may transmit the rotational force to the lead screw 180.

According to one embodiment of the present disclosure, under the normal state in which no impact is applied to the vehicle, the first nut 171 may perform the function of moving the gear box 130 on the lead screw 180. Since the first nut 171 may be formed of plastic, less noise may occur even when the second toothed part 171*a* of the first nut 171 is engaged with the first toothed part 180*a* of the lead screw 180 and is rotated. Here, the third toothed part 173*c* defined on the inner circumferential surface of the second nut 173 formed of steel does not come into contact with the first toothed part 180*a* of the lead screw 180, and thus, noise caused by contact between the second nut 173 and the lead screw 180 may not occur even when the gear box 130 is moved.

Figure 8:
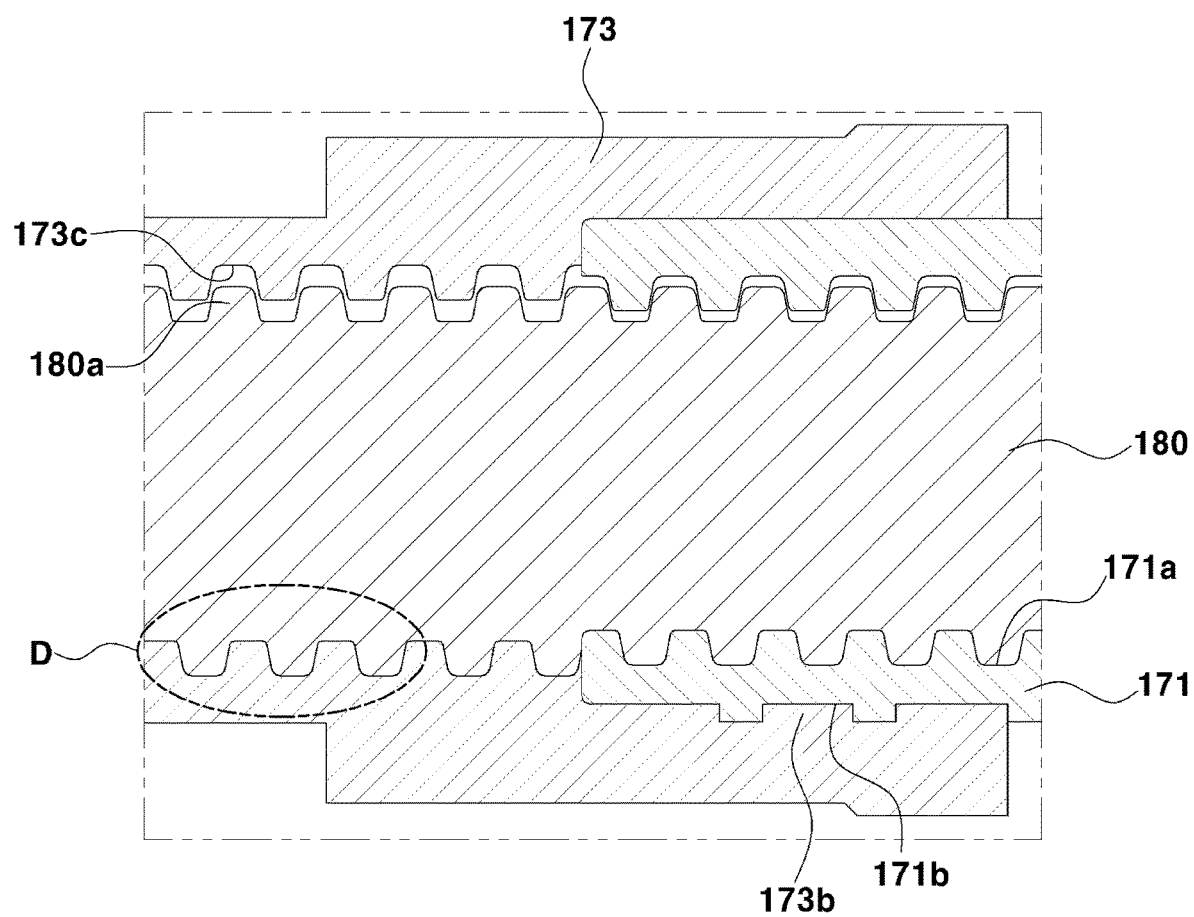
FIG. 8 is a cross-sectional view illustrating a coupling relationship between the lead screw and the nut unit in case of impact according to one embodiment of the present disclosure.

FIG. 8 is a cross-sectional view illustrating a coupling relationship between the lead screw and the nut unit in case of impact according to one embodiment of the present disclosure. FIG. 8 illustrates the coupling relationship between the lead screw and the nut unit in case of forward collision of the vehicle. For the purpose of brief explanation, a description of redundant content will be omitted.

Referring to FIGS. 3, 6 and 8, in case that impact is applied to the vehicle, the first nut 171 may be deformed, and the third toothed part 173*c* of the second nut 173 may be engaged with the first toothed part 180*a* of the lead screw 180. The first nut 171 is formed of plastic not steel, and may thus be deformed due to characteristics of the material of the first nut 171 when impact is applied to the vehicle. In this case, the third toothed part 173 of the second nut 173 may come into contact with the first toothed part 180*a* of the lead screw 180, and coupling between the nut unit 170 and the lead screw 180 may be maintained. The second nut 173 is formed of steel, and may thus not be deformed under impact applied to the vehicle.

In this embodiment, forward collision of the vehicle is described and, in case of forward collision of the vehicle, the seat may be moved obliquely based on the proceeding direction of the vehicle. In FIG. 8, the seat may be moved in a direction towards the top left in case of forward collision of the vehicle. The third toothed part 173*c* on the inner circumferential surface of the second nut 173 remains contactless with or disengaged from the first toothed part 180*a* on the outer circumferential surface of the lead screw 180 at normal times, but the third toothed part 173*c* is engaged with the first toothed part 180*a* when impact is applied to the seat. Concretely, when impact is applied to the seat, force to move the gear box 130 connected to the seat frame to the top left may be applied to the gear box 130. Here, a lower end D of the third toothed part 173*c* is engaged with the first toothed part 180*a*, and thus, the seat may be fixed without being moved in the forward and rearward directions. That is, the third toothed part 173*c* is engaged with the first toothed part 180*a*, thereby being capable of preventing the seat from being separated from the rail or the lead screw 180.

According to one embodiment of the present disclosure, when impact is applied to the vehicle, the third toothed part 173*c* of the second nut 173 may be engaged with the first toothed part 180*a*. The second nut 173 is formed of steel, has high rigidity compared to the first nut 171, and may thus maintain the state in which the gear box 130 connected to the seat frame is coupled to the lead screw 180. Therefore, separation of the seat from the rail or the lead screw 180 may be prevented.

As is apparent from the above description, in a seat sliding apparatus for vehicles according to one embodiment of the present disclosure, a part of a gear box may be disposed under the bottom surface of the interior space of a vehicle, and the other part of the gear box may be disposed on the bottom surface of the interior space of the vehicle, by a power transmission belt. Therefore, a lead screw may be disposed below the bottom surface of the interior space of the vehicle, and the gear box may be moved along the lead screw in the state in which only the part of the gear box is exposed upwards from the bottom surface, thereby being capable of exhibiting an advantageous effect of achieving wide use of the interior space of the vehicle through reduction in the installation height of the seat sliding apparatus.

In the seat sliding apparatus according to one embodiment of the present disclosure, under the normal state in which no impact is applied to the vehicle, a first nut may perform a function of moving the gear box on the lead screw. Since the first nut is formed of plastic, less noise may occur even when a second toothed part of the first nut is engaged with a first toothed part of the lead screw and is rotated. Here, a third toothed part defined on the inner circumferential surface of a second nut formed of steel does not come into contact with the first toothed part of the lead screw, and thus, noise caused by contact between the second nut and the lead screw may not occur even when the gear box is moved.

In the seat sliding apparatus according to one embodiment of the present disclosure, when impact is applied to the vehicle, the third toothed part of the second nut may be engaged with the first toothed part of the lead screw. The second nut is formed of steel, has high rigidity compared to the first nut, and may thus maintain the state in which the gear box connected to a seat frame is coupled to the lead screw. Therefore, separation of the seat from a rail or the lead screw may be prevented.

The present disclosure has been described in detail with reference to example embodiments thereof. However, it should be apparent to those skilled in the art that various substitutions, changes and modifications which are not exemplified herein but are still within the spirit and scope of the present disclosure may be made. Therefore, the scope of the present disclosure is defined not by the detailed description, but by the claims and their equivalents, and all variations within the scope of the claims and their equivalents are to be construed as being included in the present disclosure.

What is claimed is:

1. A seat sliding apparatus for a vehicle, comprising:
a lead screw including a first toothed part on an outer circumferential surface thereof, and disposed in forward and rearward directions of a vehicle;
a worm gear configured to be rotated by a driving motor;
a transmission gear assembly configured to be engaged with the worm gear to be rotated by the worm gear;
a power transmission belt configured to be engaged with the transmission gear assembly; and
a nut unit including a first nut including a second toothed part defined on an inner circumferential surface thereof, the second toothed part configured to be engaged with the first toothed part, the nut unit further including a second nut configured to come into contact with the power transmission belt,
wherein the second nut is configured to be rotated by the power transmission belt, and the first nut connected to the second nut is configured to be moved along the lead screw by rotational force of the second nut.

2. The seat sliding apparatus of claim 1, wherein:
a third toothed part is defined on an inner circumferential surface of the second nut; and
a predetermined gap is formed between the third toothed part and the first toothed part, in a normal state of the seat sliding apparatus when impact is not applied to the seat sliding apparatus.

3. The seat sliding apparatus of claim 2, wherein:
a height of each of teeth of the third toothed part is greater than a height of each of teeth of the second toothed part.

4. The seat sliding apparatus of claim 2, wherein the first nut is deformed and the third toothed part of the second nut is engaged with the first toothed part such that the predetermined gap is altered, when impact is applied to the seat sliding apparatus.

5. The seat sliding apparatus of claim 2, wherein the second nut is formed of a material having a greater rigidity than the first nut.

6. The seat sliding apparatus of claim 1, wherein:
an inner circumferential surface of the second nut is divided into a first area in which a third toothed part is disposed, and a second area in which a plurality of protrusions are disposed; and
the plurality of the protrusions in the second area are engaged with a plurality of depressions formed on an outer circumferential surface of the first nut.

7. The seat sliding apparatus of claim 6, wherein:
a part of the first nut in which the depressions are formed on the outer circumferential surface thereof is inserted into the second area of the second nut.

8. The seat sliding apparatus of claim 1, wherein:
the transmission gear assembly comprises a helical gear engaged with the worm gear, and a spur gear engaged with the power transmission belt; and
a belt toothed part engaged with a spur gear toothed part provided on an outer circumferential surface of the spur gear is provided on an inner peripheral surface of the power transmission belt.

9. The seat sliding apparatus of claim 8, wherein a fourth toothed part engaged with a belt toothed part provided on an inner circumferential surface of the power transmission belt is provided on a part of an outer circumferential surface of the second nut.

10. The seat sliding apparatus of claim 9, wherein a number of teeth of the spur gear engaged with the belt toothed part and a number of teeth of the fourth tooth part of the second nut engaged with the belt toothed part are different.

11. The seat sliding apparatus of claim 1, further comprising:
a gear box configured to surround the worm gear, the transmission gear assembly, the power transmission belt and the nut unit,
wherein:
a first part of the gear box is disposed within an interior space of a vehicle, and a second part of the gear box is disposed outside an interior space to be exposed such that the nut unit is disposed inside the interior space, and the worm gear and the transmission gear assembly are disposed outside the interior space.

* * * * *